(12) United States Patent
Hirata et al.

(10) Patent No.: US 7,898,775 B2
(45) Date of Patent: Mar. 1, 2011

(54) MAGNETORESISTIVE DEVICE HAVING BIAS MAGNETIC FIELD APPLYING LAYER THAT INCLUDES TWO MAGNETIC LAYERS ANTIFERROMAGNETICALLY COUPLED TO EACH OTHER THROUGH INTERMEDIATE LAYER

(75) Inventors: Kei Hirata, Tokyo (JP); Shinji Hara, Tokyo (JP); Takayasu Kanaya, Tokyo (JP); Takeo Kagami, Tokyo (JP)

(73) Assignee: TDK Corporation, Tokyo (JP)

( * ) Notice: Subject to any disclaimer, the term of this patent is extended or adjusted under 35 U.S.C. 154(b) by 899 days.

(21) Appl. No.: 11/826,290

(22) Filed: Jul. 13, 2007

(65) Prior Publication Data

US 2008/0043370 A1    Feb. 21, 2008

(30) Foreign Application Priority Data

Aug. 17, 2006   (JP) .................................. 2006-222565

(51) Int. Cl.
*G11B 5/39* (2006.01)
(52) U.S. Cl. .................................................. 360/324.12
(58) Field of Classification Search .............. 360/324.12
See application file for complete search history.

(56) References Cited

U.S. PATENT DOCUMENTS

| | | | | |
|---|---|---|---|---|
| 6,663,987 B2* | 12/2003 | Kakihara | .................... | 428/811.2 |
| 6,888,706 B2* | 5/2005 | Ooshima | .................. | 360/324.12 |
| 7,515,388 B2* | 4/2009 | Zhang et al. | ............. | 360/324.12 |
| 2004/0207962 A1* | 10/2004 | Saito et al. | ................ | 360/324.11 |
| 2005/0018367 A1* | 1/2005 | Terunuma et al. | ........ | 360/324.12 |
| 2005/0264955 A1* | 12/2005 | Freitag et al. | ............ | 360/324.12 |
| 2006/0198059 A1* | 9/2006 | Sakai et al. | .............. | 360/324.12 |
| 2006/0279881 A1* | 12/2006 | Sato | .......................... | 360/324.12 |
| 2007/0206335 A1* | 9/2007 | Freitag et al. | ............ | 360/324.12 |
| 2009/0316308 A1* | 12/2009 | Saito et al. | ................. | 360/324.1 |

FOREIGN PATENT DOCUMENTS

| | | |
|---|---|---|
| JP | A 8-50709 | 2/1996 |
| JP | A 8-315325 | 11/1996 |
| JP | A 9-180134 | 7/1997 |

* cited by examiner

*Primary Examiner* — Mark Blouin
(74) *Attorney, Agent, or Firm* — Oliff & Berridge, PLC

(57) ABSTRACT

An MR element includes a free layer whose direction of magnetization changes in response to an external magnetic field. Two bias magnetic field applying layers are disposed adjacent to two side surfaces of the MR element. Each bias magnetic field applying layer includes a nonmagnetic intermediate layer, and a first magnetic layer and a second magnetic layer disposed to sandwich the intermediate layer. The first and second magnetic layers are antiferromagnetically exchange-coupled to each other through RKKY interaction.

10 Claims, 6 Drawing Sheets

MAGNETORESISTIVE DEVICE HAVING BIAS MAGNETIC FIELD APPLYING LAYER THAT INCLUDES TWO MAGNETIC LAYERS ANTIFERROMAGNETICALLY COUPLED TO EACH OTHER THROUGH INTERMEDIATE LAYER

BACKGROUND OF THE INVENTION

1. Field of the Invention

The present invention relates to a magnetoresistive device including a magnetoresistive element and a bias magnetic field applying layer, and to a thin-film magnetic head, a head gimbal assembly, a head arm assembly and a magnetic disk drive each including this magnetoresistive device.

2. Description of the Related Art

Performance improvements in thin-film magnetic heads have been sought as areal recording density of magnetic disk drives has increased. A widely used type of thin-film magnetic head is a composite thin-film magnetic head that has a structure in which a write head having an induction-type electromagnetic transducer for writing and a read head having a magnetoresistive element (that may be hereinafter referred to as MR element) for reading are stacked on a substrate.

MR elements include giant magnetoresistive (GMR) elements utilizing a giant magnetoresistive effect, and tunneling magnetoresistive (TMR) elements utilizing a tunneling magnetoresistive effect.

Read heads are required to have characteristics of high sensitivity and high output capability. As the read heads that satisfy such requirements, GMR heads that employ spin-valve GMR elements have been mass-produced. Recently, to adapt to further improvements in areal recording density, developments have been pursued for read heads employing TMR elements.

Typically, a spin-valve GMR element includes: a nonmagnetic conductive layer having two surfaces facing toward opposite directions; a free layer disposed adjacent to one of the two surfaces of the nonmagnetic conductive layer; a pinned layer disposed adjacent to the other of the two surfaces of the nonmagnetic conductive layer; and an antiferromagnetic layer disposed adjacent to a surface of the pinned layer farther from the nonmagnetic conductive layer. The free layer is a ferromagnetic layer whose direction of magnetization changes in response to a signal magnetic field. The pinned layer is a ferromagnetic layer whose direction of magnetization is fixed. The antiferromagnetic layer is a layer that fixes the direction of magnetization of the pinned layer by means of exchange coupling with the pinned layer.

Conventional GMR heads have a structure in which a current used for detecting magnetic signals (that is hereinafter called a sense current) is fed in the direction parallel to the plane of each layer making up the GMR element. Such a structure is called a current-in-plane (CIP) structure. On the other hand, developments have been made for another type of GMR heads having a structure in which the sense current is fed in a direction intersecting the plane of each layer making up the GMR element, such as the direction perpendicular to the plane of each layer making up the GMR element. Such a structure is called a current-perpendicular-to-plane (CPP) structure. A GMR element used for read heads having the CPP structure is hereinafter called a CPP-GMR element. A GMR element used for read heads having the CIP structure is hereinafter called a CIP-GMR element.

A read head that employs the TMR element mentioned previously is of the CPP structure. Typically, the TMR element includes: a tunnel barrier layer having two surfaces facing toward opposite directions; a free layer disposed adjacent to one of the two surfaces of the tunnel barrier layer; a pinned layer disposed adjacent to the other of the two surfaces of the tunnel barrier layer; and an antiferromagnetic layer disposed adjacent to a surface of the pinned layer farther from the tunnel barrier layer. The tunnel barrier layer is a nonmagnetic insulating layer that allows electrons to pass therethrough with spins thereof maintained by means of the tunnel effect. The free layer, the pinned layer and the antiferromagnetic layer are the same as those of the spin-valve GMR element.

Typically, bias magnetic field applying layers for applying a bias magnetic field to the free layer are provided on two sides of the MR element that are opposed to each other in the direction of track width. The bias magnetic field aligns the magnetization of the free layer to a certain direction in the absence of any signal magnetic field applied to the MR element, and thereby brings the free layer into a single magnetic domain state. Occurrence of Barkhausen noise in output signals of the read head is thereby suppressed. Each bias magnetic field applying layer is typically formed of a hard magnetic layer having a high coercivity or a stack of a ferromagnetic layer and an antiferromagnetic layer, for example.

FIG. 11 illustrates an example of a read head including bias magnetic field applying layers having a typical configuration. FIG. 11 is a cross-sectional view of the example of the read head. This read head has the CPP structure. The read head illustrated in FIG. 11 includes: a first shield layer 103, an MR element 105 disposed on the first shield layer 103, and a second shield layer 108 disposed on the MR element 105. The MR element 105 is a CPP-GMR element or a TMR element. This read head further includes two bias magnetic field applying layers 106 that are respectively disposed adjacent to two side surfaces of the MR element 105 and apply a bias magnetic field to the MR element 105, and an insulating layer 109 disposed between each bias magnetic field applying layer 106 and a stack of the first shield layer 103 and the MR element 105. The shield layers 103 and 108 also function as electrodes for feeding a sense current to the MR element 105. In this example, the bias magnetic field applying layers 106 are each formed of a single hard magnetic layer.

JP9-180134A, JP8-315325A, and JP8-050709A disclose bias magnetic field applying layers having a configuration other than the typical configuration described above. The bias magnetic field applying layers disclosed in JP9-180134A are each formed of a stack of three or more layers including a ferromagnetic layer, an antiferromagnetic layer and a ferromagnetic layer. In the bias magnetic field applying layers of this publication, the ferromagnetic layer and the antiferromagnetic layer are exchange-coupled to each other.

The bias magnetic field applying layers disclosed in JP8-315325A each include a magnetic separation layer and two magnetic field applying layers disposed to sandwich the magnetic separation layer. The two magnetic field applying layers are magnetized in opposite directions through the use of a difference in coercivity between the two layers.

The bias magnetic field applying layers disclosed in JP8-050709A are each formed of a stack of two hard magnetic layers having different coercivities.

Conventionally, in thin-film magnetic heads, there are cases in which the state of magnetization in the bias magnetic field applying layers or in the two shield layers disposed on the top and bottom of the MR element is changed by various factors, and as a result, there occurs a change in the bias magnetic field applied to the free layer to cause a sudden variation in the output signals of the read head. Factors that cause a change in the state of magnetization in the bias magnetic field applying layers or in the shield layers include, for example, a variation in an external magnetic field, stress generated in the bias magnetic field applying layers or in the shield layers due to a collision between the thin-film magnetic head and the recording medium, and stress generated in the bias magnetic field applying layers or in the shield layers due to heat generated when writing is performed by the write head.

The variation in the output signals of the read head mentioned above impairs the reliability of the thin-film magnetic head, and therefore it needs to be suppressed. One of effective measures against the variation in the output signals of the read head is to allow the bias magnetic field applying layers to generate a stable bias magnetic field that resists being changed by a variation in the external magnetic field and the generation of stress.

To allow the bias magnetic field applying layers to generate a stable bias magnetic field, it is effective to increase the thickness of the bias magnetic field applying layers to thereby increase the magnitude of the bias magnetic field, or to increase the anisotropic energy of the bias magnetic field applying layers to thereby increase the coercivity and the squareness ratio of the bias magnetic field applying layers.

However, an increase in thickness of the bias magnetic field applying layers leads to an increase in the read gap length or the distance between the two shield layers, and this hinders an increase in linear recording density of a magnetic disk drive.

In the bias magnetic field applying layers each formed of a hard magnetic layer, the hard magnetic layer has a magnetic anisotropy in the in-plane direction. It is difficult to increase the anisotropic energy of the bias magnetic field applying layers of this type, because of the reason described below. In the bias magnetic field applying layers each formed of a hard magnetic layer, anisotropic energy is obtained mainly through the use of magnetocrystalline anisotropy. However, in a case where the bias magnetic field applying layers are formed by an ordinary method such as sputtering, it is very difficult to align the magnetocrystalline anisotropy across the entire bias magnetic field applying layers. It is therefore difficult to increase the anisotropic energy of the bias magnetic field applying layers of this type.

In the bias magnetic field applying layers each formed of a stack of a ferromagnetic layer and an antiferromagnetic layer, as taught in JP9-180134A, if the thickness of the ferromagnetic layer is increased to obtain a bias magnetic field of greater magnitude, the magnitude of the exchange coupling magnetic field produced by the ferromagnetic layer and the antiferromagnetic layer is reduced and the bias magnetic field thereby becomes variable.

In the bias magnetic field applying layers each formed of a stack of three or more layers including a ferromagnetic layer, an antiferromagnetic layer and a ferromagnetic layer as disclosed in JP9-180134A, the proportion of the thickness of the antiferromagnetic layer in the total thickness of each bias magnetic field applying layer is relatively high, and therefore it is difficult to increase the magnitude of the bias magnetic field without increasing the total thickness of each bias magnetic field applying layer.

According to the bias magnetic field applying layers disclosed in JP8-315325A, the two magnetic field applying layers are simply magnetized in opposite directions through the use of the difference in coercivity between the two layers, and therefore it is not possible to obtain an effect of ensuring stability of the bias magnetic field generated from the bias magnetic field applying layers. Likewise, the bias magnetic field applying layers disclosed in JP8-050709A cannot provide the effect of ensuring stability of the bias magnetic field generated therefrom.

OBJECT AND SUMMARY OF THE INVENTION

It is an object of the present invention to provide a magnetoresistive device including a magnetoresistive element and a bias magnetic field applying layer wherein the magnetoresistive element includes a magnetosensitive layer whose direction of magnetization changes in response to an external magnetic field and the bias magnetic field applying layer applies to the magnetosensitive layer a bias magnetic field for bringing the magnetosensitive layer into a single magnetic domain state, the magnetoresistive device achieving an enhanced coercivity of the bias magnetic field applying layer and thereby allowing a stable bias magnetic field to be applied to the magnetosensitive layer, and to provide a thin-film magnetic head, a head gimbal assembly, a head arm assembly and a magnetic disk drive each including this magnetoresistive device.

A magnetoresistive device of the present invention includes: a magnetoresistive element having a resistance that changes in response to an external magnetic field, the magnetoresistive element including a magnetosensitive layer having a direction of magnetization that changes in response to the external magnetic field; and a bias magnetic field applying layer that applies to the magnetosensitive layer a bias magnetic field for bringing the magnetosensitive layer into a single magnetic domain state in the absence of any external magnetic field applied thereto. The magnetoresistive element has a side surface that includes a side surface of the magnetosensitive layer, and the bias magnetic field applying layer is disposed adjacent to the side surface of the magnetoresistive element. The bias magnetic field applying layer includes: a nonmagnetic intermediate layer having a first surface and a second surface that face toward opposite directions; a first magnetic layer disposed adjacent to the first surface of the intermediate layer; and a second magnetic layer disposed adjacent to the second surface of the intermediate layer. The first magnetic layer and the second magnetic layer are antiferromagnetically exchange-coupled to each other.

In the magnetoresistive device of the invention, the first magnetic layer may have a maximum thickness greater than a maximum thickness of the second magnetic layer. In this case, the first magnetic layer and the second magnetic layer may be made of materials the same as each other, and the maximum thickness of the second magnetic layer may be within a range of 8.7% to 25% of the maximum thickness of the first magnetic layer.

In the magnetoresistive device of the invention, at least part of the first magnetic layer may be disposed adjacent to the side surface of the magnetosensitive layer.

The magnetoresistive device of the invention may further include a base layer on which the magnetoresistive element is disposed, the magnetoresistive element may have a width that decreases with increasing distance from the base layer, and the first magnetic layer may be disposed closer to the base layer than the second magnetic layer.

In the magnetoresistive device of the invention, the magnetoresistive element may further include a pinned layer having a fixed direction of magnetization, and a nonmagnetic spacer layer disposed between the magnetosensitive layer and the pinned layer.

A thin-film magnetic head of the invention includes a medium facing surface that faces toward a recording medium, and the magnetoresistive device of the invention disposed near the medium facing surface to detect a signal magnetic field sent from the recording medium.

A head gimbal assembly of the invention includes: a slider including the thin-film magnetic head of the invention and disposed to face toward a recording medium; and a suspension flexibly supporting the slider. A head arm assembly of the invention includes: a slider including the thin-film magnetic head of the invention and disposed to face toward a recording medium; a suspension flexibly supporting the slider; and an arm for making the slider travel across tracks of the recording medium, the suspension being attached to the arm.

A magnetic disk drive of the invention includes: a slider including the thin-film magnetic head of the invention and disposed to face toward a recording medium that is driven to rotate; and an alignment device supporting the slider and aligning the slider with respect to the recording medium.

According to the invention, the bias magnetic field applying layer of the magnetoresistive device includes the nonmagnetic intermediate layer having a first surface and a second surface that face toward opposite directions, the first magnetic layer disposed adjacent to the first surface of the intermediate layer, and the second magnetic layer disposed adjacent to the second surface of the intermediate layer, and the first and second magnetic layers are antiferromagnetically exchange-coupled to each other. These features of the invention make it possible to enhance the coercivity of the bias magnetic field applying layer and to thereby apply a stable bias magnetic field to the magnetosensitive layer.

Other and further objects, features and advantages of the invention will appear more fully from the following description.

DETAILED DESCRIPTION OF THE PREFERRED EMBODIMENTS

First Embodiment

Figure 2:
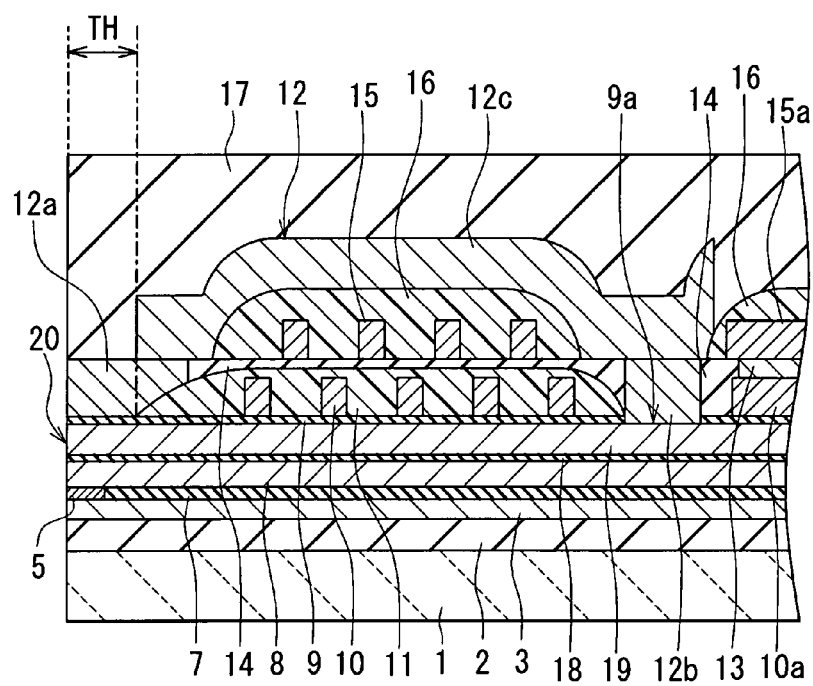
FIG. 2 is a cross-sectional view illustrating a cross section of a thin-film magnetic head of the first embodiment of the invention, the cross section being orthogonal to the medium facing surface and the substrate.
Figure 3:
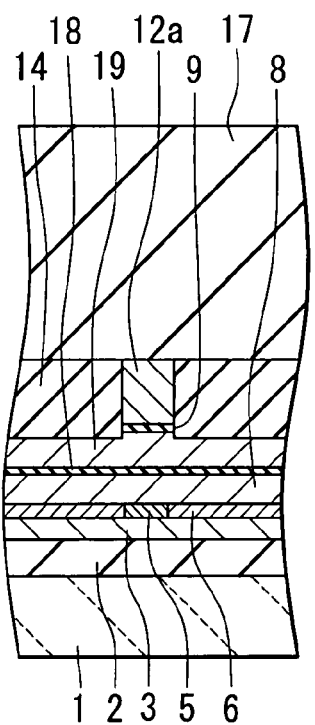
FIG. 3 is a cross-sectional view illustrating a cross section of a pole portion of the thin-film magnetic head of the first embodiment of the invention, the cross section being parallel to the medium facing surface.

Preferred embodiments of the invention will now be described in detail with reference to the accompanying drawings. Reference is now made to FIG. 2 and FIG. 3 to describe an outline of the configuration and a manufacturing method of a thin-film magnetic head of a first embodiment of the invention. FIG. 2 is a cross-sectional view illustrating a cross section of the thin-film magnetic head orthogonal to a medium facing surface and a substrate. FIG. 3 is a cross-sectional view illustrating a cross section of a pole portion of the thin-film magnetic head parallel to the medium facing surface.

The thin-film magnetic head of the embodiment has a medium facing surface 20 that faces toward a recording medium. The thin-film magnetic head includes: a substrate 1 made of a ceramic material such as aluminum oxide and titanium carbide ($Al_2O_3$—TiC); an insulating layer 2 made of an insulating material such as alumina ($Al_2O_3$) and disposed on the substrate 1; a first shield layer 3 made of a magnetic material and disposed on the insulating layer 2; an MR element 5 disposed on the first shield layer 3; two bias magnetic field applying layers 6 disposed adjacent to two side surfaces of the MR element 5, respectively; and an insulating layer 7 disposed around the MR element 5 and the bias magnetic field applying layers 6. The MR element 5 is disposed near the medium facing surface 20. The insulating layer 7 is made of an insulating material such as alumina.

The thin-film magnetic head further includes: a second shield layer 8 made of a magnetic material and disposed on the MR element 5, the bias magnetic field applying layers 6 and the insulating layer 7; a separating layer 18 made of a nonmagnetic material such as alumina and disposed on the second shield layer 8; and a bottom pole layer 19 made of a magnetic material and disposed on the separating layer 18. The magnetic material used for the second shield layer 8 and the bottom pole layer 19 is a soft magnetic material such as NiFe, CoFe, CoFeNi or FeN. Alternatively, a second shield layer that also functions as a bottom pole layer may be provided in place of the second shield layer 8, the separating layer 18 and the bottom pole layer 19.

The thin-film magnetic head further includes a write gap layer 9 made of a nonmagnetic material such as alumina and disposed on the bottom pole layer 19. The write gap layer 9 has a contact hole 9a formed in a region away from the medium facing surface 20.

The thin-film magnetic head further includes a first layer portion 10 of a thin-film coil disposed on the write gap layer 9. The first layer portion 10 is made of a conductive material such as copper (Cu). In FIG. 2, reference sign 10a indicates a connecting portion of the first layer portion 10 connected to a second layer portion 15 of the thin-film coil described later. The first layer portion 10 is wound around the contact hole 9a.

The thin-film magnetic head further includes: an insulating layer 11 made of an insulating material and disposed to cover the first layer portion 10 of the thin-film coil and the write gap layer 9 disposed around the first layer portion 10; a top pole layer 12 made of a magnetic material; and a connecting layer 13 made of a conductive material and disposed on the connecting portion 10a. The connecting layer 13 may be made of a magnetic material. Each of the outer and inner edge portions of the insulating layer 11 has a rounded oblique shape.

The top pole layer 12 includes a track width defining layer 12a, a coupling portion layer 12b and a yoke portion layer 12c. The track width defining layer 12a is disposed on regions of the write gap layer 9 and the insulating layer 11, the regions extending from an oblique portion of the insulating layer 11 closer to the medium facing surface 20 toward the medium facing surface 20. The track width defining layer 12a includes: a front-end portion that is formed on the write gap layer 9 and functions as the pole portion of the top pole layer 12; and a connecting portion that is formed on the oblique portion of the insulating layer 11 closer to the medium facing surface 20 and is connected to the yoke portion layer 12c. The front-end portion has a width equal to the write track width. The connecting portion has a width greater than that of the front-end portion.

The coupling portion layer 12b is disposed on a region of the bottom pole layer 19 where the contact hole 9a is formed. The yoke portion layer 12c couples the track width defining layer 12a and the coupling portion layer 12b to each other. An end of the yoke portion layer 12c closer to the medium facing surface 20 is located at a distance from the medium facing surface 20. The yoke portion layer 12c is connected to the bottom pole layer 19 through the coupling portion layer 12b.

The thin-film magnetic head further includes an insulating layer 14 made of an inorganic insulating material such as alumina and disposed around the coupling portion layer 12b. The track width defining layer 12a, the coupling portion layer 12b, the connecting layer 13 and the insulating layer 14 have flattened top surfaces.

The thin-film magnetic head further includes the second layer portion 15 of the thin-film coil disposed on the insulating layer 14. The second layer portion 15 is made of a conductive material such as copper (Cu). In FIG. 2, reference sign 15a indicates a connecting portion of the second layer portion 15 connected to the connecting portion 10a of the first layer portion 10 of the thin-film coil through the connecting layer 13. The second layer portion 15 is wound around the coupling portion layer 12b.

The thin-film magnetic head further includes an insulating layer 16 disposed to cover the second layer portion 15 of the thin-film coil and the insulating layer 14 around the second layer portion 15. Outer and inner edge portions of the insulating layer 16 each have a rounded oblique shape. Part of the yoke portion layer 12c is located on the insulating layer 16.

The thin-film magnetic head further includes an overcoat layer 17 disposed to cover the top pole layer 12. The overcoat layer 17 is made of alumina, for example.

The outline of the method of manufacturing the thin-film magnetic head of the embodiment will now be described. In the method of manufacturing the thin-film magnetic head of the embodiment, first, on the substrate 1 the insulating layer 2 is formed to have a thickness of 0.2 to 5 µm, for example, by a method such as sputtering. Next, the first shield layer 3 is formed into a predetermined pattern on the insulating layer 2 by a method such as plating. Next, although not shown, an insulating layer of alumina, for example, is formed over the entire surface. Next, the insulating layer is polished by chemical mechanical polishing (hereinafter referred to as CMP), for example, so that the first shield layer 3 is exposed, and the top surfaces of the first shield layer 3 and the insulating layer are thereby flattened.

Next, the MR element 5, the two bias magnetic field applying layers 6 and the insulating layer 7 are formed on the first shield layer 3. Next, the second shield layer 8 is formed by plating or sputtering, for example, on the MR element 5, the bias magnetic field applying layers 6 and the insulating layer 7. Next, the separating layer 18 is formed by sputtering, for example, on the second shield layer 8. Next, the bottom pole layer 19 is formed on the separating layer 18 by plating or sputtering, for example.

Next, the write gap layer 9 is formed to have a thickness of 50 to 300 nm, for example, on the bottom pole layer 19 by a method such as sputtering. Next, in order to make a magnetic path, the contact hole 9a is formed by partially etching the write gap layer 9 at a center portion of the thin-film coil that will be formed later.

Next, the first layer portion 10 of the thin-film coil is formed to have a thickness of 2 to 3 µm, for example, on the write gap layer 9. The first layer portion 10 is wound around the contact hole 9a.

Next, the insulating layer 11 is formed into a predetermined pattern to cover the first layer portion 10 of the thin-film coil and the write gap layer 9 disposed around the first layer portion 10. The insulating layer 11 is made of an organic insulating material that exhibits fluidity when heated, such as photoresist. Next, heat treatment is given at a predetermined temperature to flatten the surface of the insulating layer 11. Through this heat treatment, each of the outer and inner edge portions of the insulating layer 11 is formed into a rounded oblique shape.

Next, the track width defining layer 12a of the top pole layer 12 is formed on regions of the write gap layer 9 and the insulating layer 11, the regions extending from the oblique portion of the insulating layer 11 closer to the medium facing surface 20 described later toward the medium facing surface 20.

When the track width defining layer 12a is formed, the coupling portion layer 12b is formed on the region of the bottom pole layer 19 where the contact hole 9a is formed, and the connecting layer 13 is formed on the connecting portion 10a at the same time.

Next, pole trimming is performed. That is, in a region around the track width defining layer 12a, the write gap layer 9 and at least part of the pole portion of the bottom pole layer 19 close to the write gap layer 9 are etched using the track width defining layer 12a as a mask. As a result, as illustrated in FIG. 3, a trim structure is formed, wherein the pole portion of the top pole layer 12, the write gap layer 9 and at least part of the pole portion of the bottom pole layer 19 have equal widths. The trim structure prevents an increase in effective track width resulting from an expansion of magnetic flux near the write gap layer 9.

Next, the insulating layer 14 is formed to have a thickness of 3 to 4 µm, for example, over the entire top surface of the stack of layers that has been obtained through the foregoing steps. The insulating layer 14 is then polished by CMP, for example, to reach the surfaces of the track width defining layer 12a, the coupling portion layer 12b and the connecting layer 13, and is flattened.

Next, the second layer portion 15 of the thin-film coil is formed to have a thickness of 2 to 3 µm, for example, on the insulating layer 14 that has been flattened. The second layer portion 15 is wound around the coupling portion layer 12b.

Next, the insulating layer 16 is formed into a predetermined pattern to cover the second layer portion 15 of the thin-film coil and the insulating layer 14 disposed around the second layer portion 15. The insulating layer 16 is made of an organic insulating material that exhibits fluidity when heated, such as photoresist. Next, heat treatment is given at a predetermined temperature to flatten the surface of the insulating layer 16. Through this heat treatment, each of the outer and inner edge portions of the insulating layer 16 is formed into a rounded oblique shape. Next, the yoke portion layer 12c is formed on the track width defining layer 12a, the insulating layers 14 and 16, and the coupling portion layer 12b.

Next, the overcoat layer 17 is formed to cover the entire top surface of the stack of layers that has been obtained through the foregoing steps. Wiring, terminals and so on are then formed on the overcoat layer 17. Finally, machining of the slider including the foregoing layers is performed to form the medium facing surface 20. The thin-film magnetic head including a write head and a read head is thus completed.

The thin-film magnetic head thus manufactured has the medium facing surface 20 that faces toward the recording medium, the read head, and the write head. The read head is disposed near the medium facing surface 20 to detect a signal magnetic field sent from the recording medium. The read head corresponds to the magnetoresistive device of the embodiment. The configuration of the read head will be described in detail later.

The write head includes: the bottom pole layer 19 and the top pole layer 12 that are magnetically coupled to each other and include their respective pole portions that are opposed to each other and placed in regions of the pole layers on a side of the medium facing surface 20; the write gap layer 9 provided between the pole portion of the bottom pole layer 19 and the pole portion of the top pole layer 12; and the thin-film coil including the portions 10 and 15 at least part of which is placed between the bottom pole layer 19 and the top pole layer 12 and insulated from the bottom pole layer 19 and the top pole layer 12. In this thin-film magnetic head, as illustrated in FIG. 2, the length from the medium facing surface 20 to the end of the insulating layer 11 closer to the medium facing surface 20 corresponds to throat height TH. The throat height refers to a length (height) from the medium facing surface 20 to a point at which the distance between the two pole layers starts to increase. It should be noted that, while the write head illustrated in FIG. 2 and FIG. 3 is one for use for a longitudinal magnetic recording system, the write head of the embodiment may be one for use for a perpendicular magnetic recording system.

Figure 1:
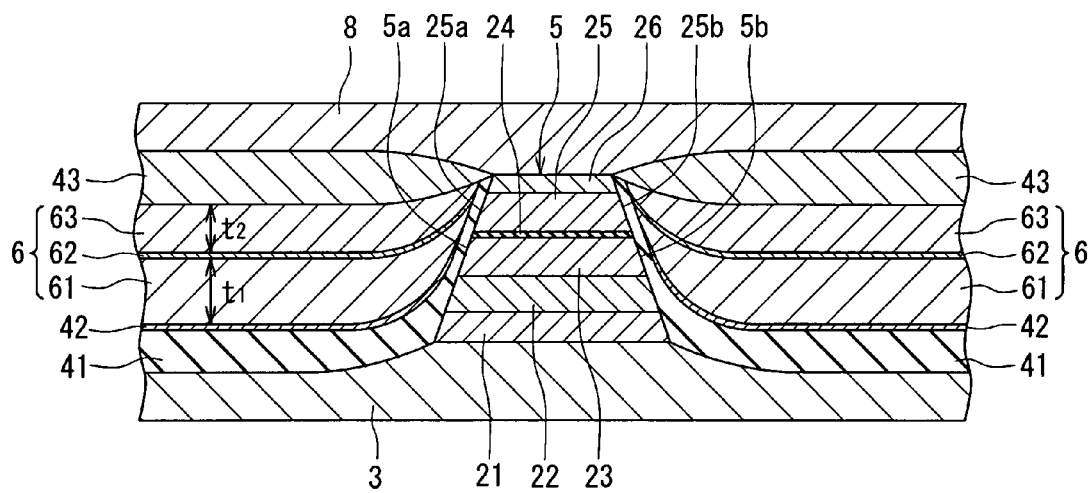
FIG. 1 is a cross-sectional view illustrating a cross section of a read head of a first embodiment of the invention, the cross section being parallel to the medium facing surface.

Reference is now made to FIG. 1 to describe the details of the configuration of the read head, that is, the magnetoresistive device, of the embodiment. FIG. 1 is a cross-sectional view of the read head parallel to the medium facing surface. The read head of the embodiment includes: the first shield layer 3 and the second shield layer 8 disposed at a predetermined distance from each other; the MR element 5 disposed between the first shield layer 3 and the second shield layer 8; and the two bias magnetic field applying layers 6 that are respectively disposed adjacent to the two side surfaces of the MR element 5 and that apply a bias magnetic field to the MR element 5. The read head further includes: an insulating layer 41 disposed between each bias magnetic field applying layer 6 and a stack of the first shield layer 3 and the MR element 5; an underlying layer 42 disposed between the insulating layer 41 and the bias magnetic field applying layers 6; and two protection layers 43 disposed between the second shield layer 8 and the two bias magnetic field applying layers 6, respectively.

The MR element 5 of the embodiment is a TMR element. A sense current that is a current for detecting magnetic signals is fed to the MR element 5 in a direction intersecting the plane of each layer making up the MR element 5, such as the direction perpendicular to the plane of each layer making up the MR element 5. The first shield layer 3 and the second shield layer 8 also function as a pair of electrodes for feeding the sense current to the MR element 5 in a direction intersecting the plane of each layer making up the MR element 5, such as the direction perpendicular to the plane of each layer making up the MR element 5. Alternatively, besides the first shield layer 3 and the second shield layer 8, there may be provided a pair of electrodes on the top and bottom of the MR element 5, respectively. The MR element 5 has a resistance that changes in response to an external magnetic field, that is, a signal magnetic field from the recording medium. The resistance of the MR element 5 can be determined from the sense current. It is thus possible to read data stored on the recording medium through the use of the read head.

The MR element 5 includes an underlying layer 21, an antiferromagnetic layer 22, a pinned layer 23, a spacer layer 24, a free layer 25 and a protection layer 26 that are stacked in this order on the first shield layer 3. The pinned layer 23 is a ferromagnetic layer whose direction of magnetization is fixed. The antiferromagnetic layer 22 is a layer for fixing the direction of magnetization of the pinned layer 23 by means of exchange coupling with the pinned layer 23. The underlying layer 21 is provided for improving the crystallinity and orientability of each layer formed thereon and particularly for enhancing the exchange coupling between the antiferromagnetic layer 22 and the pinned layer 23. The free layer 25 is a ferromagnetic layer whose direction of magnetization changes in response to an external magnetic field, that is, a signal magnetic field sent from the recording medium. The free layer 25 corresponds to the magnetosensitive layer of the present invention. The protection layer 26 is provided for protecting the layers located therebelow.

In the example illustrated in FIG. 1, the pinned layer 23 is disposed closer to the first shield layer 3 than the free layer 25. However, the reverse is possible, that is, the free layer 25 may be disposed closer to the first shield layer 3 than the pinned layer 23.

The underlying layer 21 has a thickness of 2 to 6 nm, for example. The underlying layer 21 may be formed of a stack of a Ta layer and an Ru layer, for example.

The antiferromagnetic layer 22 has a thickness of 5 to 30 nm, for example. The antiferromagnetic layer 22 is made of an antiferromagnetic material containing Mn and at least one element $M_{II}$ selected from the group consisting of Pt, Ru, Rh, Pd, Ni, Cu, Ir, Cr and Fe, for example. The Mn content of the material is preferably equal to or higher than 35 atomic percent and lower than or equal to 95 atomic percent, while the content of the other element $M_{II}$ of the material is preferably equal to or higher than 5 atomic percent and lower than or equal to 65 atomic percent. There are two types of the antiferromagnetic material, one is a non-heat-induced antiferromagnetic material that exhibits antiferromagnetism without any heat treatment and induces an exchange coupling magnetic field between a ferromagnetic material and itself, while the other is a heat-induced antiferromagnetic material that exhibits antiferromagnetism by undergoing heat treatment. The antiferromagnetic layer 22 can be made of either of these types. Examples of the non-heat-induced antiferromagnetic material include an Mn alloy having a γ phase, such as RuRhMn, FeMn or IrMn. Examples of the heat-induced antiferromagnetic material include an Mn alloy having a regular crystal structure, such as PtMn, NiMn or PtRhMn.

As a layer for fixing the direction of magnetization of the pinned layer 23, a hard magnetic layer made of a hard magnetic material such as CoPt may be provided in place of the antiferromagnetic layer 22 described above. In this case, the material of the underlying layer 21 is Cr, CrTi or TiW, for example.

In the pinned layer 23, the direction of magnetization is fixed by exchange coupling with the antiferromagnetic layer 22 at the interface between the antiferromagnetic layer 22 and the pinned layer 23. The pinned layer 23 has a thickness of 3 to 6 nm, for example. The pinned layer 23 may be a so-called synthetic pinned layer having an outer layer, a nonmagnetic intermediate layer and an inner layer that are stacked in this order on the antiferromagnetic layer 22. In this case, each of the outer layer and the inner layer is a ferromagnetic layer. The outer layer and the inner layer are antiferromagnetically coupled to each other and the directions of magnetization thereof are fixed to opposite directions.

The spacer layer 24 is a tunnel barrier layer that allows electrons to pass therethrough with spins thereof maintained by means of the tunnel effect. The spacer layer 24 has a thickness of 0.5 to 2 nm, for example. The spacer layer 24 is made of an insulating material which may be an oxide or a nitride of Al, Ni, Gd, Mg, Ta, Mo, Ti, W, Hf or Zr, for example.

The free layer 25 has a thickness of 2 to 10 nm, for example. The free layer 25 is formed of a ferromagnetic layer having a low coercivity. The free layer 25 may include a stack of a plurality of ferromagnetic layers.

The protection layer 26 has a thickness of 0.5 to 10 nm, for example. The protection layer 26 may be formed of a Ta layer or an Ru layer. The protection layer 26 may also be formed into a two-layer structure made up of a combination of a Ta layer and an Ru layer, or a three-layer structure made up of a combination of a Ta layer, an Ru layer and a Ta layer or a combination of an Ru layer, a Ta layer and an Ru layer, for example.

The plane geometry of each of the layers 21 to 26 is rectangular. Each of the layers 21 to 26 therefore has four side surfaces. The MR element 5 has four side surfaces made up of the four side surfaces of each of the layers 21 to 26. One of the four side surfaces of the MR element 5 is located in the medium facing surface 20, another is located opposite to the one located in the medium facing surface 20, and the other two side surfaces are respectively located on both sides of the MR element 5 opposed to each other in the direction of track width and are illustrated in FIG. 1 with reference signs 5a and 5b. The free layer 25 has side surfaces 25a and 25b respectively located on both sides opposed to each other in the direction of track width. The side surfaces 5a and 5b of the MR element 5 include the side surfaces 25a and 25b of the free layer 25, respectively.

In the embodiment, the MR element 5 is disposed on the first shield layer 3. The first shield layer 3 therefore corresponds to the base layer of the present invention. As illustrated in FIG. 1, the MR element 5 has a width that decreases with increasing distance from the first shield layer 3.

The insulating layer 41 has a thickness of 3 to 10 nm, for example. The insulating layer 41 is made of an insulating material such as alumina. The insulating layer 41 covers the first shield layer 3 except for the portion thereof on which the MR element 5 is disposed, and further covers the side surfaces of the MR element 5 except for the one located in the medium facing surface 20.

The underlying layer 42 has a thickness of 2 to 7 nm, for example. The underlying layer 42 is made of Cr, CrTi, TiW, CrW or CrMo, for example.

The two bias magnetic field applying layers 6 are disposed on the underlying layer 42 so as to be adjacent to the side surfaces 5a and 5b of the MR element 5, respectively. The bias magnetic field applying layers 6 apply to the free layer 25 a bias magnetic field for bringing the free layer 25 into a single magnetic domain state in the absence of any external magnetic field applied to the MR element 5.

As illustrated in FIG. 1, each bias magnetic field applying layer 6 includes: a nonmagnetic intermediate layer 62 having a first surface (bottom surface) and a second surface (top surface) that face toward opposite directions; a first magnetic layer 61 disposed adjacent to the first surface of the intermediate layer 62, and a second magnetic layer 63 disposed adjacent to the second surface of the intermediate layer 62. The first magnetic layer 61 and the second magnetic layer 63 are antiferromagnetically exchange-coupled to each other through RKKY interaction. The direction of magnetization of the first magnetic layer 61 and that of the second magnetic layer 63 are therefore opposite to each other. As described above, in the embodiment, each bias magnetic field applying layer 6 has a three-layer structure including the nonmagnetic intermediate layer 62 and the first and second magnetic layers 61 and 63 that are disposed to sandwich the intermediate layer 62 and are antiferromagnetically exchange-coupled to each other, that is, what is called a synthetic structure. While the direction of magnetization of the first magnetic layer 61 and that of the second magnetic layer 63 are opposite to each other, they are both in the direction of track width.

In the embodiment, the first magnetic layers 61 are disposed closer to the first shield layer 3 than the second magnetic layers 63. The first magnetic layers 61 are disposed on the underlying layer 42. Each first magnetic layer 61 includes a portion located above the top surface of the first shield layer 3 and a portion located beside the side surface 5a or 5b of the MR element 5. In each first magnetic layer 61, the portion located beside the side surface 5a or 5b is smaller in thickness than the portion located above the top surface of the first shield layer 3. Therefore, the maximum thickness $t_1$ of each first magnetic layer 61 is the maximum thickness of the portion thereof located above the top surface of the first shield layer 3.

In each bias magnetic field applying layer 6, the intermediate layer 62 is disposed on the first magnetic layer 61. Each intermediate layer 62 includes a portion located above the top surface of the first shield layer 3 and a portion located beside the side surface 5a or 5b of the MR element 5. In each intermediate layer 62, the portion located beside the side surface 5a or 5b is smaller in thickness than the portion located above the top surface of the first shield layer 3.

In each bias magnetic field applying layer 6, the second magnetic layer 63 is disposed on the intermediate layer 62. Each second magnetic layer 63 includes a portion located above the top surface of the first shield layer 3 and a portion located beside the side surface 5a or 5b of the MR element 5. In each second magnetic layer 63, the portion located beside the side surface 5a or 5b is smaller in thickness than the portion located above the top surface of the first shield layer 3. Therefore, the maximum thickness $t_2$ of each second magnetic layer 63 is the maximum thickness of the portion thereof located above the top surface of the first shield layer 3.

The first and second magnetic layers 61 and 63 are each made of a magnetic material. Examples of the materials of the first and second magnetic layers 61 and 63 include CoPt, CoCrPt, CoCrTa, CoCrPtTa, FePt, and TbFeCo. The materials of the first and second magnetic layers 61 and 63 may be the same as or different from each other.

The intermediate layers 62 are made of a nonmagnetic material. Examples of the material of the intermediate layers 62 include Ru, Rh, Cr, Cu, Pd, Pt, Os, Ir, Au, Ag, and Re. Each intermediate layer 62 is designed to have such a thickness that an antiferromagnetic exchange coupling between the first and second magnetic layers 61 and 63 is produced through RKKY interaction. The thickness of each intermediate layer 62 is preferably within a range of 0.3 to 2.0 nm.

The protection layers 43 are disposed on the second magnetic layers 63. The protection layers 43 each have a maximum thickness of 1 to 7 nm, for example. The protection layers 43 may be made of a conductive material or an insulating material. Examples of the material of the protection layers 43 include Cr, CrTi, Ta, AuCu, Ru, Al$_2$O$_3$, and Ti.

In the embodiment, in each bias magnetic field applying layer 6 the maximum thickness t$_1$ of the first magnetic layer 61 is greater than the maximum thickness t$_2$ of the second magnetic layer 63. In the case where the first and second magnetic layers 61 and 63 are made of the same material, it is preferred that the maximum thickness t$_2$ of the second magnetic layer 63 be within a range of 8.7% to 25% of the maximum thickness t$_1$ of the first magnetic layer 61, in view of experiment results described later. Furthermore, at least part of each first magnetic layer 61 is disposed adjacent to the side surface 25a or 25b of the free layer 25 with the insulating layer 41 and the underlying layer 42 disposed therebetween.

Figure 8:
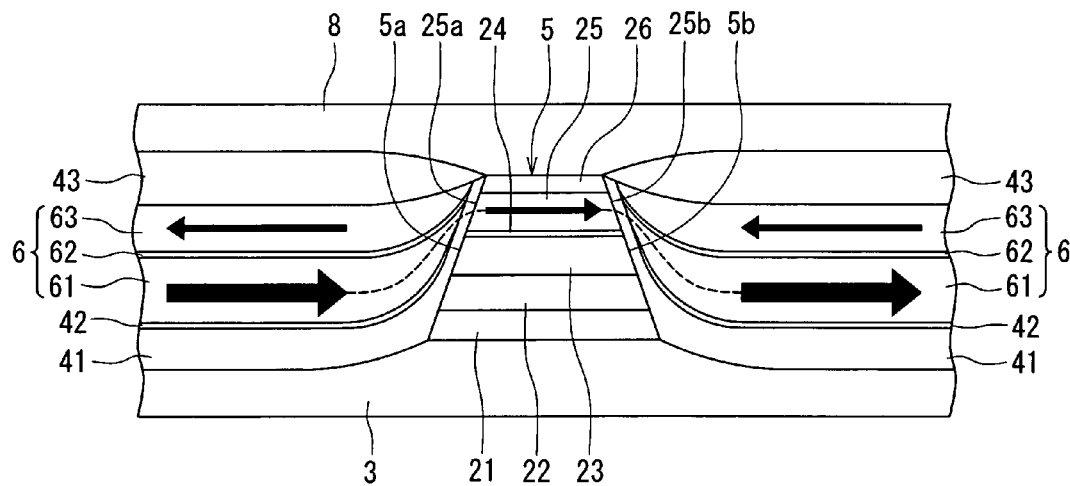
FIG. 8 is an explanatory view illustrating the directions of magnetization of the bias magnetic field applying layers and the free layer of the read head of FIG. 1.

FIG. 8 is an explanatory view illustrating the directions of magnetization of the bias magnetic field applying layers 6 and the free layer 25 of the read head of FIG. 1. In FIG. 8 the directions of magnetization of the first magnetic layers 61, the second magnetic layers 63 and the free layer 25 are indicated with arrows having their respective thicknesses. The thicknesses of the arrows conceptually indicate the sum total of magnetic moments in the respective layers 61, 63 and 25. In the embodiment, as illustrated in FIG. 8, the sum total of the magnetic moments in the first magnetic layers 61 is greater than the sum total of the magnetic moments in the second magnetic layers 63. Furthermore, part of each first magnetic layer 61 is located closer to the side surface 25a or 25b of the free layer 25 than part of each second magnetic layer 63. Because of this, the direction of the bias magnetic field applied from the bias magnetic field applying layers 6 to the free layer 25 is parallel to the direction of magnetization of the first magnetic layers 61. As a result, in the absence of any external magnetic field applied, the direction of magnetization of the free layer 25 is parallel to the direction of magnetization of the first magnetic layers 61.

A fabrication method for the read head of FIG. 1 will now be described. In the fabrication method for the read head, first, the first shield layer 3 having a predetermined pattern is formed on the insulating layer 2 by a method such as plating. Next, films to be the respective layers making up the MR element 5 are formed one by one on the first shield layer 3 by sputtering, for example. Next, these films are patterned by etching to thereby form the MR element 5. Next, the insulating layer 41, the underlying layer 42, the first magnetic layers 61, the intermediate layers 62, the second magnetic layers 63 and the protection layers 43 are formed in this order by sputtering, for example. Next, the insulating layer 7 illustrated in FIG. 2 is formed around the MR element 5 and the bias magnetic field applying layers 6. Next, the second shield layer 8 is formed on the MR element 5, the protection layers 43 and the insulating layer 7 by plating or sputtering, for example. After that, the bias magnetic field applying layers 6 are magnetized such that the direction of magnetization of the first magnetic layers 61 is aligned with the direction of track width.

The operation of the thin-film magnetic head of the embodiment will now be described. The thin-film magnetic head writes data on a recording medium by using the write head and reads data written on the recording medium by using the read head.

In the read head, the direction of the bias magnetic field produced by the bias magnetic field applying layers 6 intersects the direction orthogonal to the medium facing surface 20 at a right angle. In the MR element 5, in the absence of any signal magnetic field, the direction of magnetization of the free layer 25 is aligned with the direction of the bias magnetic field. The direction of magnetization of the pinned layer 23 is fixed to the direction orthogonal to the medium facing surface 20.

In the MR element 5, the direction of magnetization of the free layer 25 changes in response to a signal magnetic field sent from the recording medium. This causes a change in the relative angle between the direction of magnetization of the free layer 25 and the direction of magnetization of the pinned layer 23, and as a result, the resistance of the MR element 5 changes. The resistance of the MR element 5 can be determined from the potential difference between the first and second shield layers 3 and 8 produced when a sense current is fed to the MR element 5 from the shield layers 3 and 8. It is thus possible for the read head to read data stored on the recording medium.

Features of the read head of the embodiment will now be described. In the embodiment, in each bias magnetic field applying layer 6, the first magnetic layer 61 and the second magnetic layer 63 are antiferromagnetically exchange-coupled to each other. This makes it possible to enhance the effective coercivity of the bias magnetic field applying layers 6, and as a result, it becomes possible to apply a stable bias magnetic field to the free layer 25.

In the embodiment, in each bias magnetic field applying layer 6, the maximum thickness t$_1$ of the first magnetic layer 61 is greater than the maximum thickness t$_2$ of the second magnetic layer 63. Furthermore, at least part of each first magnetic layer 61 is disposed adjacent to the side surface 25a or 25b of the free layer 25 with the insulating layer 41 and the underlying layer 42 disposed therebetween. This makes it possible to align the direction of magnetization of the free layer 25 in the absence of any signal magnetic field applied thereto with the direction parallel to the direction of magnetization of the first magnetic layers 61.

In the case where the first and second magnetic layers 61 and 63 are made of the same material, it is preferred that the maximum thickness t$_2$ of the second magnetic layer 63 be within the range of 8.7% to 25% of the maximum thickness t$_1$ of the first magnetic layer 61, in view of the experiment results described later.

In the embodiment, the MR element 5 has a width that decreases with increasing distance from the first shield layer 3, and the first magnetic layers 1 are disposed closer to the first shield layer 3 than the second magnetic layers 63. As a result, it becomes possible that part of each first magnetic layer 61 is located closer to the side surface 25a or 25b of the free layer 25 than part of each second magnetic layer 63. This makes it easy to align the direction of magnetization of the free layer 25 in the absence of any signal magnetic field applied thereto with the direction parallel to the direction of magnetization of the first magnetic layers 61.

In the embodiment, the maximum thickness of each bias magnetic field applying layer 6 is preferably within a range of 10 to 40 nm. If the maximum thickness of each bias magnetic field applying layer 6 is smaller than 10 nm, it is difficult to produce a bias magnetic field of sufficient magnitude from the bias magnetic field applying layers 6. On the other hand, if the maximum thickness of each bias magnetic field applying layer 6 exceeds 40 nm, the read gap length or the distance between the two shield layers 3 and 8 increases and it is therefore difficult to increase the linear recording density of the magnetic disk drive.

The following describes an experiment performed to determine a preferable range of the ratio of the maximum thickness t$_2$ of the second magnetic layer 63 to the maximum thickness t$_1$ of the first magnetic layer 61. In this experiment, first, 100 each of seven types of samples 1 to 7 of a thin-film magnetic head including a read head and a write head were prepared. General configurations of the samples 1 to 7 are as illustrated in FIG. 2 and FIG. 3. The configuration of the read head of each of the samples 2 to 7 is as illustrated in FIG. 1. However, the configuration of the bias magnetic field applying layers 6 is different among the samples 2 to 7. The configuration of the read head of the sample 1 is the same as that of the read head of the samples 2 to 7 except that the sample 1 has bias magnetic field applying layers each formed of a single layer, in place of the bias magnetic field applying layers 6 each including the three layers 61 to 63. In each of the samples 1 to 7, the underlying layer 42 is a Cr layer having a thickness of 3.5 nm, and each protection layer 43 is a Cr layer having a thickness of 5 nm.

In the sample 1, each bias magnetic field applying layer is formed of a single CoPt layer having a maximum thickness of 25 nm. In the samples 2 to 7, each intermediate layer 62 is an Ru layer having a thickness of 0.8 nm, and the first and second magnetic layers 61 and 63 are both made of CoPt. The samples 2 to 7 have different combinations of the maximum thickness $t_1$ of the first magnetic layer 61 and the maximum thickness $t_2$ of the second magnetic layer 63. The values of $t_1$ and $t_2$ of the samples 2 to 7 will be presented in a table later. In the experiment, the coercivity and the squareness ratio of the bias magnetic field applying layers were determined for the samples 1 to 7. The results will also be shown in the table later.

In the experiment, a quasi static test was performed on each of the samples 1 to 7 to study the effects of heat generated during the writing operation of the write head and stress generated in the read head due to the heat on the output of the read head. Specifically, with the write current in the write head set to 59 mA, a difference between the outputs of the read head before and after feeding the write current to the write head was checked. In this test, cases where there was a difference of 20% or higher between the outputs of the read head before and after feeding the write current to the write head were evaluated as defective, and the percent defective was determined in 100 each of the samples 1 to 7.

Table 1 below lists the maximum thickness $t_1$ (nm) of the first magnetic layer 61, the maximum thickness $t_2$ (nm) of the second magnetic layer 63, $t_2/t_1$ (%), the coercivity (Oe) (1 Oe=79.6 A/m) of the bias magnetic field applying layers, the squareness ratio of the bias magnetic field applying layers, and the percent defective (%) for each of the samples 1 to 7. For the sample 1, the single layer constituting each bias magnetic field applying layer is defined as the first magnetic layer 61 for the sake of convenience, so that $t_1$ is defined as 25 nm while $t_2$ as 0 nm.

TABLE 1

| Sample | $t_1$ (nm) | $t_2$ (nm) | $t_2/t_1$ (%) | Coercivity (Oe) | Squareness ratio | Percent defective (%) |
| --- | --- | --- | --- | --- | --- | --- |
| 1 | 25 | 0 | 0 | 1650 | 0.88 | 7 |
| 2 | 24 | 1 | 4.2 | 1640 | 0.88 | 7 |
| 3 | 23 | 2 | 8.7 | 1720 | 0.86 | 5 |
| 4 | 22 | 3 | 13.6 | 1820 | 0.85 | 2 |
| 5 | 20 | 5 | 25.0 | 1710 | 0.84 | 5 |
| 6 | 20 | 7 | 35.0 | 1680 | 0.75 | 7 |
| 7 | 18 | 7 | 38.9 | 1640 | 0.72 | 11 |

As shown in Table 1, each of the samples 3 to 5 has a higher coercivity and a lower percent defective as compared with the sample 1 whose bias magnetic field applying layers are each formed of a single layer. In the samples 3 to 5, $t_2/t_1$ ranges from 8.7% to 25%. The percent defective of each of the samples 2 and 6 is equal to that of the sample 1, while $t_2/t_1$ of the sample 2 is 4.2% and that of the sample 6 is 35%. The sample 7 in which $t_2/t_1$ is 38.9% has a percent defective higher than that of the sample 1. From these results, when the first and second magnetic layers 61 and 63 are made of the same material, it is preferred that the maximum thickness $t_2$ of the second magnetic layer 63 be within a range of 8.7% to 25% of the maximum thickness $t_1$ of the first magnetic layer 61.

It is considered that when $t_2/t_1$ is lower than 8.7%, the state of magnetization of the first magnetic layers 61 becomes predominant in the state of magnetization of the entire bias magnetic field applying layers 6, and as a result, it becomes difficult to satisfactorily enhance the effective coercivity of the bias magnetic field applying layers 6 through the antiferromagnetic exchange coupling between the first and second magnetic layers 61 and 63.

On the other hand, it is considered that when $t_2/t_1$ exceeds 25%, the sum total of the magnetic moments in the second magnetic layers 63 whose direction of magnetization is opposite to the direction of the bias magnetic field is too great, which causes a reduction in magnitude of the bias magnetic field and a reduction in effective coercivity of the bias magnetic field applying layers 6, thereby making the bias magnetic field unstable.

Figure 4:
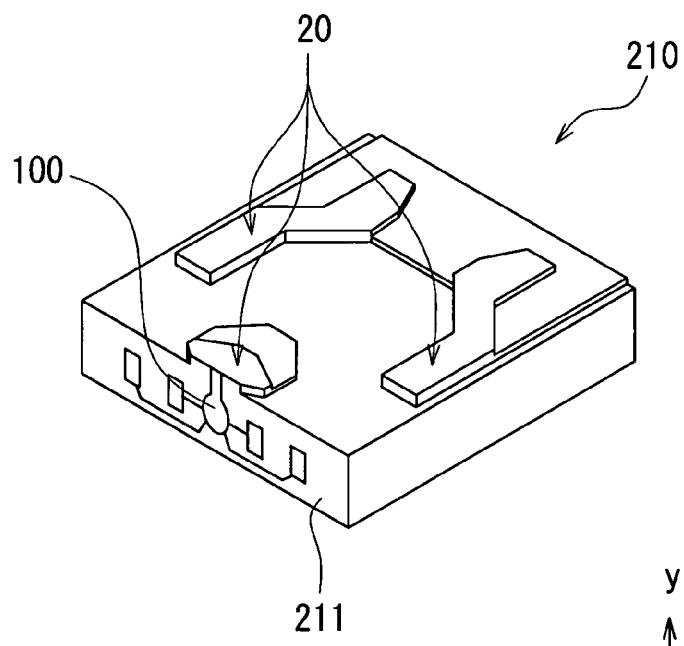
FIG. 4 is a perspective view illustrating a slider incorporated in a head gimbal assembly of the first embodiment of the invention.

A head gimbal assembly, a head arm assembly and a magnetic disk drive of the embodiment will now be described. Reference is now made to FIG. 4 to describe a slider 210 incorporated in the head gimbal assembly. In the magnetic disk drive, the slider 210 is placed to face toward a magnetic disk platter that is a circular-plate-shaped recording medium to be driven to rotate. The slider 210 has a base body 211 made up mainly of the substrate 1 and the overcoat layer 17 of FIG. 2. The base body 211 is nearly hexahedron-shaped. One of the six surfaces of the base body 211 faces toward the magnetic disk platter. The medium facing surface 20 is formed in this one of the surfaces. When the magnetic disk platter rotates in the z direction of FIG. 4, an airflow passes between the magnetic disk platter and the slider 210, and a lift is thereby generated below the slider 210 in the y direction of FIG. 4 and exerted on the slider 210. The slider 210 flies over the surface of the magnetic disk platter by means of the lift. The x direction of FIG. 4 is across the tracks of the magnetic disk platter. The thin-film magnetic head 100 of the embodiment is formed near the air-outflow-side end (the end located at the lower left of FIG. 4) of the slider 210.

Figure 5:
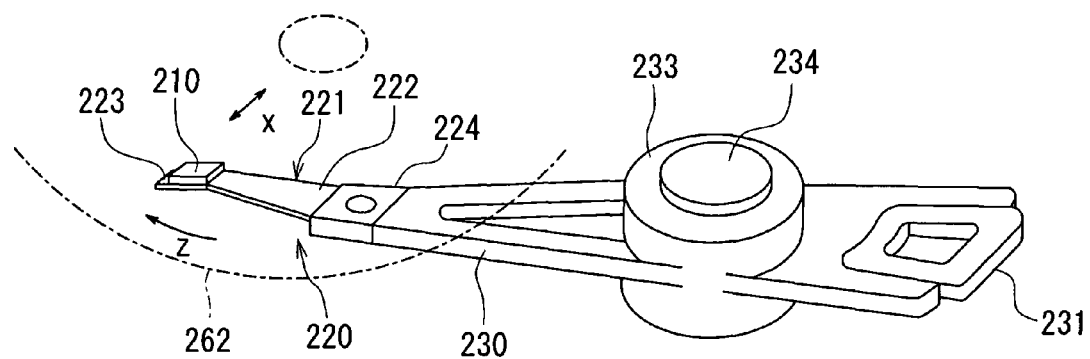
FIG. 5 is a perspective view illustrating a head arm assembly of the first embodiment of the invention.

Reference is now made to FIG. 5 to describe the head gimbal assembly 220 of the embodiment. The head gimbal assembly 220 includes the slider 210 and a suspension 221 that flexibly supports the slider 210. The suspension 221 includes: a plate-spring-shaped load beam 222 made of stainless steel, for example; a flexure 223 to which the slider 210 is joined, the flexure 223 being located at an end of the load beam 222 and giving an appropriate degree of freedom to the slider 210; and a base plate 224 located at the other end of the load beam 222. The base plate 224 is attached to an arm 230 of an actuator for moving the slider 210 along the x direction across the tracks of the magnetic disk platter 262. The actuator incorporates the arm 230 and a voice coil motor that drives the arm 230. A gimbal section for maintaining the orientation of the slider 210 is provided in the portion of the flexure 223 on which the slider 210 is mounted.

The head gimbal assembly 220 is attached to the arm 230 of the actuator. An assembly having the arm 230 and the head gimbal assembly 220 attached to the arm 230 is called a head arm assembly. An assembly having a carriage with a plurality of arms wherein the head gimbal assembly 220 is attached to each of the arms is called a head stack assembly.

FIG. 5 illustrates the head arm assembly of the embodiment. In the head arm assembly, the head gimbal assembly 220 is attached to an end of the arm 230. A coil 231 that is part of the voice coil motor is fixed to the other end of the arm 230. A bearing 233 is provided in the middle of the arm 230. The bearing 233 is attached to a shaft 234 that rotatably supports the arm 230.

Figure 6:
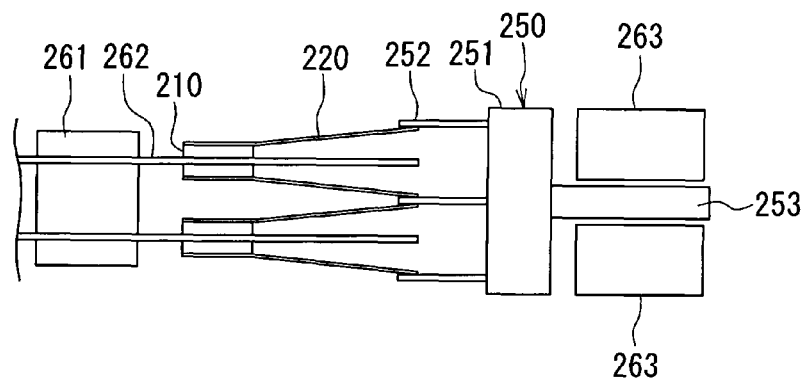
FIG. 6 is an explanatory view for illustrating a main part of a magnetic disk drive of the first embodiment of the invention.
Figure 7:
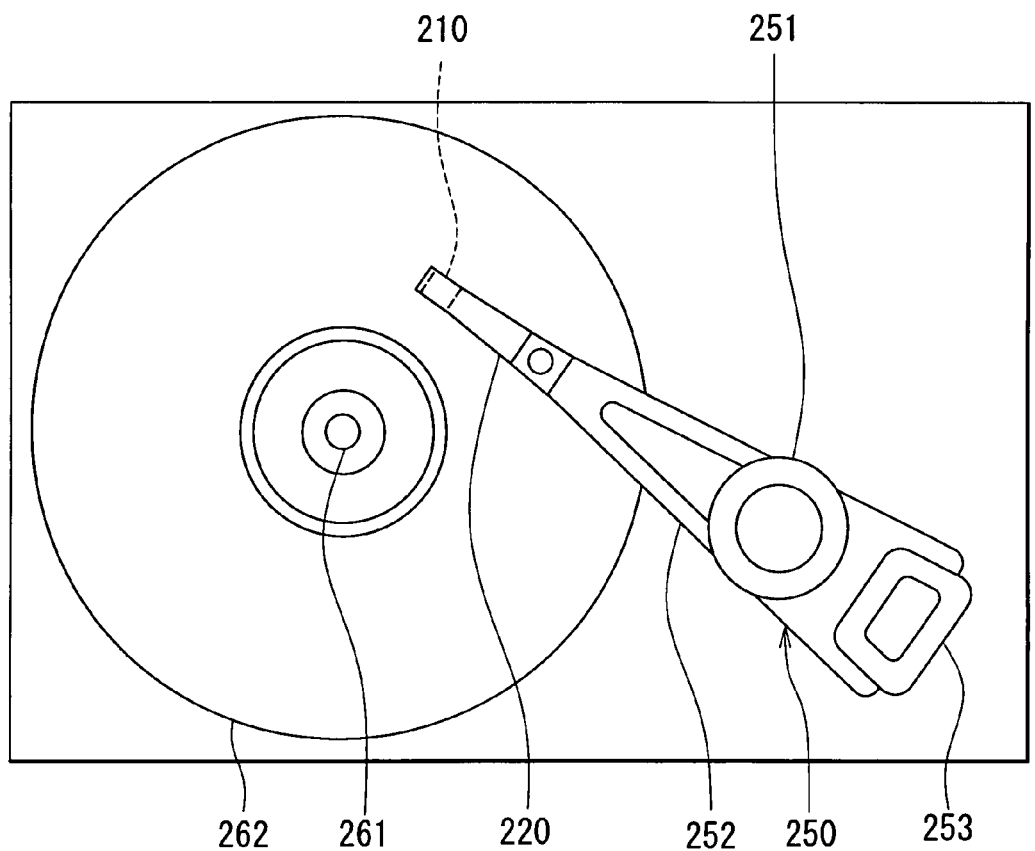
FIG. 7 is a top view of the magnetic disk drive of the first embodiment of the invention.

Reference is now made to FIG. 6 and FIG. 7 to describe an example of the head stack assembly and the magnetic disk drive of the embodiment. FIG. 6 illustrates a main part of the magnetic disk drive. FIG. 7 is a top view of the magnetic disk drive. The head stack assembly 250 includes a carriage 251 having a plurality of arms 252. A plurality of head gimbal assemblies 220 are attached to the arms 252 such that the assemblies 220 are aligned in the vertical direction with spacing between adjacent ones. A coil 253 that is part of the voice coil motor is mounted on the carriage 251 on a side opposite to the arms 252. The head stack assembly 250 is installed in the magnetic disk drive. The magnetic disk drive includes a plurality of magnetic disk platters 262 mounted on a spindle motor 261. Two of the sliders 210 are allocated to each of the platters 262, such that the two sliders 210 are opposed to each other with each of the platters 262 disposed in between. The voice coil motor includes permanent magnets 263 disposed to be opposed to each other, the coil 253 of the head stack assembly 250 being placed between the magnets 263.

The actuator and the head stack assembly 250 except the sliders 210 correspond to the alignment device of the invention and support the sliders 210 and align them with respect to the magnetic disk platters 262.

In the magnetic disk drive of the embodiment, the actuator moves the slider 210 across the tracks of the magnetic disk platter 262 and aligns the slider 210 with respect to the magnetic disk platter 262. The thin-film magnetic head incorporated in the slider 210 writes data on the magnetic disk platter 262 through the use of the write head and reads data stored on the magnetic disk platter 262 through the use of the read head.

The head gimbal assembly, the head arm assembly and the magnetic disk drive of the embodiment exhibit effects similar to those of the foregoing thin-film magnetic head of the embodiment.

Second Embodiment

Figure 9:
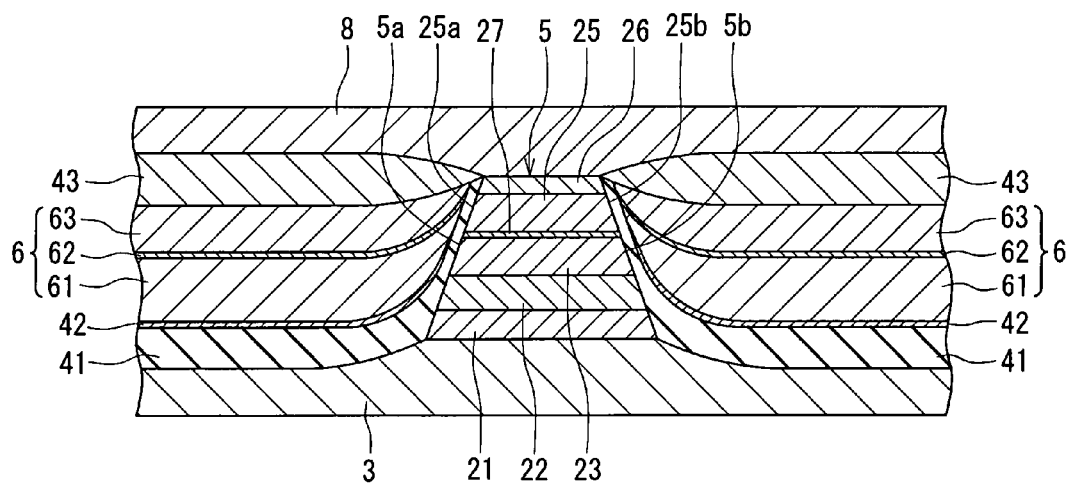
FIG. 9 is a cross-sectional view illustrating a cross section of a read head of a second embodiment of the invention, the cross section being parallel to the medium facing surface.

A second embodiment of the invention will now be described. FIG. 9 is a cross-sectional view illustrating a cross section of a read head of the second embodiment parallel to the medium facing surface. As illustrated in FIG. 9, the MR element 5 of the second embodiment is provided with a spacer layer 27 in place of the spacer layer 24 of the first embodiment. The spacer layer 27 is a nonmagnetic conductive layer. The MR element 5 of the second embodiment is thus a CPP-GMR element. The spacer layer 27 has a thickness of 1.0 to 4.0 nm, for example, and is made of a nonmagnetic conductive material containing not less than 80 weight % of at least one element selected from the group consisting of Cu, Au and Ag, for example.

In the second embodiment, as in the first embodiment, the sense current is fed to the MR element 5 in a direction intersecting the plane of each layer making up the MR element 5, such as the direction perpendicular to the plane of each layer making up the MR element 5. The remainder of configuration, operation and effects of the second embodiment are similar to those of the first embodiment.

Third Embodiment

Figure 10:
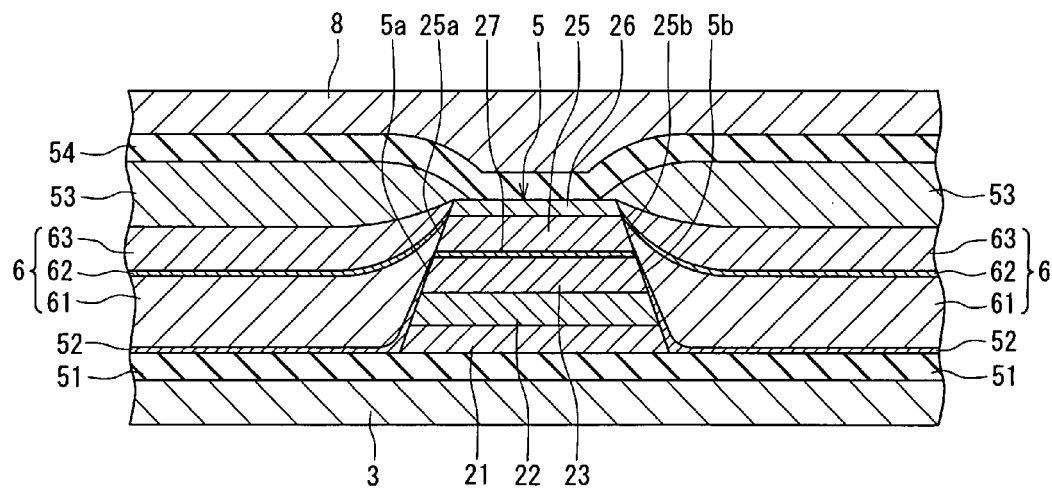
FIG. 10 is a cross-sectional view illustrating a cross section of a read head of a third embodiment of the invention, the cross section being parallel to the medium facing surface.
Figure 11:
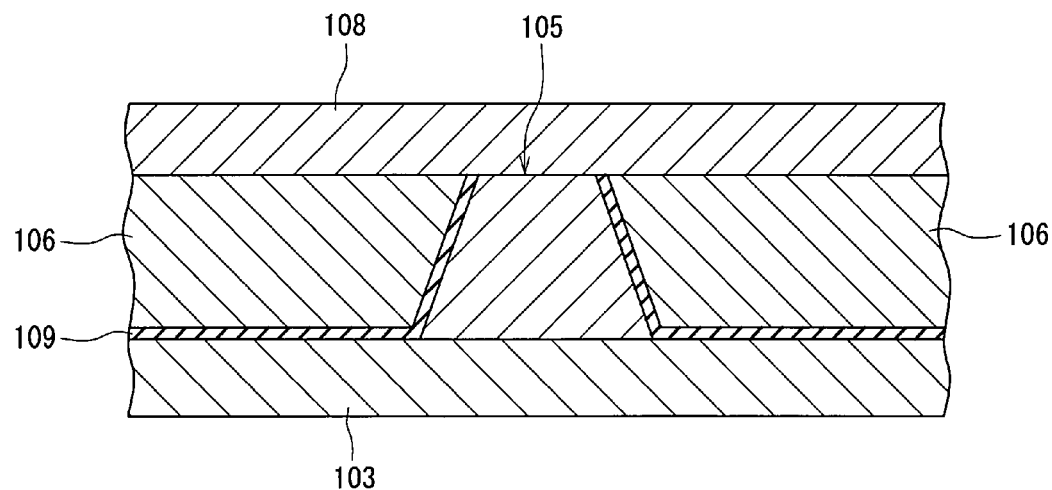
FIG. 11 is a cross-sectional view illustrating an example of a read head including bias magnetic field applying layers having a typical configuration.

A third embodiment of the invention will now be described. FIG. 10 is a cross-sectional view illustrating a cross section of a read head of the third embodiment parallel to the medium facing surface. As illustrated in FIG. 10, as in the second embodiment, the MR element 5 of the third embodiment is provided with the spacer layer 27 that is a nonmagnetic conductive layer, in place of the spacer layer 24 of the first embodiment. The thickness and material of the spacer layer 27 are the same as those of the second embodiment. The MR element 5 of the third embodiment is a CIP-GMR element.

In the third embodiment, a first shield gap film 51 formed of an insulating film is provided on the first shield layer 3, and the MR element 5 is disposed on the first shield gap film 5. Therefore, in the third embodiment the first shield gap film 51 corresponds to the base layer of the invention. As illustrated in FIG. 10, the MR element 5 has a width that decreases with increasing distance from the first shield gap film 51.

In the third embodiment, the insulating layer 41 of the first embodiment is not provided. Furthermore, in place of the underlying layer 42 of the first embodiment, there is provided an underlying layer 52 between each bias magnetic field applying layer 6 and a stack of the first shield gap film 51 and the MR element 5. The material and thickness of the underlying layer 52 are the same as those of the underlying layer 42.

In the third embodiment, the two bias magnetic field applying layers 6 are disposed on the underlying layer 52 so as to be adjacent to the side surfaces 5a and 5b of the MR element 5, respectively. On the two bias magnetic field applying layers 6 there are provided two electrode layers 53 made of a conductive material, in place of the two protection layers 43 of the first embodiment. It is optional whether the two electrode layers 53 overlap the protection layer 26 as illustrated in FIG. 10 or not. In the third embodiment, a second shield gap film 54 formed of an insulating film is provided to cover the two electrode layers 53 and the MR element 5, and the second shield layer 8 is disposed on the second shield gap film 54.

In the third embodiment, the sense current is fed to the MR element 5 from the two electrode layers 53 in the direction parallel to the plane of each layer making up the MR element 5. The remainder of configuration, operation and effects of the third embodiment are similar to those of the first embodiment.

The present invention is not limited to the foregoing embodiments but various modifications can be made thereto. For example, while the foregoing embodiments have been described with reference to a thin-film magnetic head having such a structure that the read head is formed on the base body and the write head is stacked on the read head, the read and write heads may be stacked in the reverse order.

When the thin-film magnetic head is to be used only for read operations, the magnetic head may be configured to include only the read head.

The magnetoresistive device of the invention can be used not only for a read head of a thin-film magnetic head but also for other applications such as a magnetic sensor.

It is apparent that the present invention can be carried out in various forms and modifications in the light of the foregoing descriptions. Accordingly, within the scope of the following claims and equivalents thereof, the present invention can be carried out in forms other than the foregoing most preferable embodiment.

What is claimed is:

1. A magnetoresistive device comprising:
   a magnetoresistive element having a resistance that changes in response to an external magnetic field, the magnetoresistive element including a magnetosensitive layer having a direction of magnetization that changes in response to the external magnetic field; and a bias magnetic field applying layer that applies to the magnetosensitive layer a bias magnetic field for bringing the magnetosensitive layer into a single magnetic domain state in the absence of any external magnetic field applied thereto, wherein the magnetoresistive element has a side surface that includes a side surface of the magnetosensitive layer, and the bias magnetic field applying layer is disposed adjacent to the side surface of the magnetoresistive element, the bias magnetic field applying layer includes: a nonmagnetic intermediate layer having a first surface and a second surface that face toward opposite directions; a first magnetic layer disposed adjacent to the first surface of the intermediate layer; and a second magnetic layer disposed adjacent to the second surface of the intermediate layer, the first and second magnetic layers being antiferromagnetically exchange-coupled to each other, and the direction of magnetization of the first magnetic layer and that of the second magnetic layer are opposite to each other.

2. The magnetoresistive device according to claim 1, wherein the first magnetic layer has a maximum thickness that is greater than a maximum thickness of the second magnetic layer.

3. The magnetoresistive device according to claim 2, wherein the first magnetic layer and the second magnetic layer are made of materials the same as each other, and the maximum thickness of the second magnetic layer is within a range of 8.7% to 25% of the maximum thickness of the first magnetic layer.

4. The magnetoresistive device according to claim 2, wherein at least part of the first magnetic layer is disposed adjacent to the side surface of the magnetosensitive layer.

5. The magnetoresistive device according to claim 2, further comprising a base layer on which the magnetoresistive element is disposed, wherein the magnetoresistive element has a width that decreases with increasing distance from the base layer, and the first magnetic layer is disposed closer to the base layer than the second magnetic layer.

6. The magnetoresistive device according to claim 1, wherein the magnetoresistive element further includes a pinned layer having a fixed direction of magnetization, and a nonmagnetic spacer layer disposed between the magnetosensitive layer and the pinned layer.

7. A thin-film magnetic head comprising: a medium facing surface that faces toward a recording medium; and a magnetoresistive device disposed near the medium facing surface to detect a signal magnetic field sent from the recording medium, the magnetoresistive device comprising:

a magnetoresistive element having a resistance that changes in response to an external magnetic field, the magnetoresistive element including a magnetosensitive layer having a direction of magnetization that changes in response to the external magnetic field; and a bias magnetic field applying layer that applies to the magnetosensitive layer a bias magnetic field for bringing the magnetosensitive layer into a single magnetic domain state in the absence of any external magnetic field applied thereto, wherein the magnetoresistive element has a side surface that includes a side surface of the magnetosensitive layer, and the bias magnetic field applying layer is disposed adjacent to the side surface of the magnetoresistive element, the bias magnetic field applying layer includes: a nonmagnetic intermediate layer having a first surface and a second surface that face toward opposite directions; a first magnetic layer disposed adjacent to the first surface of the intermediate layer; and a second magnetic layer disposed adjacent to the second surface of the intermediate layer, the first and second magnetic layers being antiferromagnetically exchange-coupled to each other, and the direction of magnetization of the first magnetic layer and that of the second magnetic layer are opposite to each other.

8. A head gimbal assembly comprising: a slider including a thin-film magnetic head and disposed to face toward a recording medium; and a suspension flexibly supporting the slider, the thin-film magnetic head comprising: a medium facing surface that faces toward the recording medium; and a magnetoresistive device disposed near the medium facing surface to detect a signal magnetic field sent from the recording medium, the magnetoresistive device comprising:

a magnetoresistive element having a resistance that changes in response to an external magnetic field, the magnetoresistive element including a magnetosensitive layer having a direction of magnetization that changes in response to the external magnetic field; and a bias magnetic field applying layer that applies to the magnetosensitive layer a bias magnetic field for bringing the magnetosensitive layer into a single magnetic domain state in the absence of any external magnetic field applied thereto, wherein the magnetoresistive element has a side surface that includes a side surface of the magnetosensitive layer, and the bias magnetic field applying layer is disposed adjacent to the side surface of the magnetoresistive element, the bias magnetic field applying layer includes: a nonmagnetic intermediate layer having a first surface and a second surface that face toward opposite directions; a first magnetic layer disposed adjacent to the first surface of the intermediate layer; and a second magnetic layer disposed adjacent to the second surface of the intermediate layer, the first and second magnetic layers being antiferromagnetically exchange-coupled to each other, and the direction of magnetization of the first magnetic layer and that of the second magnetic layer are opposite to each other.

9. A head arm assembly comprising: a slider including a thin-film magnetic head and disposed to face toward a recording medium; a suspension flexibly supporting the slider; and an arm for making the slider travel across tracks of the recording medium, the suspension being attached to the arm, the thin-film magnetic head comprising: a medium facing surface that faces toward the recording medium; and a magnetoresistive device disposed near the medium facing surface to detect a signal magnetic field sent from the recording medium, the magnetoresistive device comprising:

a magnetoresistive element having a resistance that changes in response to an external magnetic field, the magnetoresistive element including a magnetosensitive layer having a direction of magnetization that changes in response to the external magnetic field; and a bias magnetic field applying layer that applies to the magnetosensitive layer a bias magnetic field for bringing the magnetosensitive layer into a single magnetic domain state in the absence of any external magnetic field applied thereto, wherein the magnetoresistive element has a side surface that includes a side surface of the magnetosensitive layer, and the bias magnetic field applying layer is disposed adjacent to the side surface of the magnetoresistive element, the bias magnetic field applying layer includes: a nonmagnetic intermediate layer having a first surface and a second surface that face toward opposite directions; a first magnetic layer disposed adjacent to the first surface of the intermediate layer; and a second magnetic layer disposed adjacent to the second surface of the intermediate layer, the first and second magnetic layers being antiferromagnetically exchange-coupled to each other, and the direction of magnetization of the first magnetic layer and that of the second magnetic layer are opposite to each other.

10. A magnetic disk drive comprising: a slider including a thin-film magnetic head and disposed to face toward a recording medium that is driven to rotate; and an alignment device supporting the slider and aligning the slider with respect to the recording medium, the thin-film magnetic head comprising: a medium facing surface that faces toward the recording medium; and a magnetoresistive device disposed near the medium facing surface to detect a signal magnetic field sent from the recording medium, the magnetoresistive device comprising:

a magnetoresistive element having a resistance that changes in response to an external magnetic field, the magnetoresistive element including a magnetosensitive layer having a direction of magnetization that changes in response to the external magnetic field; and a bias magnetic field applying layer that applies to the magnetosensitive layer a bias magnetic field for bringing the magnetosensitive layer into a single magnetic domain state in the absence of any external magnetic field applied thereto, wherein the magnetoresistive element has a side surface that includes a side surface of the magnetosensitive layer, and the bias magnetic field applying layer is disposed adjacent to the side surface of the magnetoresistive element, the bias magnetic field applying layer includes: a nonmagnetic intermediate layer having a first surface and a second surface that face toward opposite directions; a first magnetic layer disposed adjacent to the first surface of the intermediate layer; and a second magnetic layer disposed adjacent to the second surface of the intermediate layer, the first and second magnetic layers being antiferromagnetically exchange-coupled to each other, and the direction of magnetization of the first magnetic layer and that of the second magnetic layer are opposite to each other.

* * * * *